J. A. COWAN.
TRACTOR.
APPLICATION FILED NOV. 23, 1917.
1,306,469.
Patented June 10, 1919.
2 SHEETS—SHEET 1.
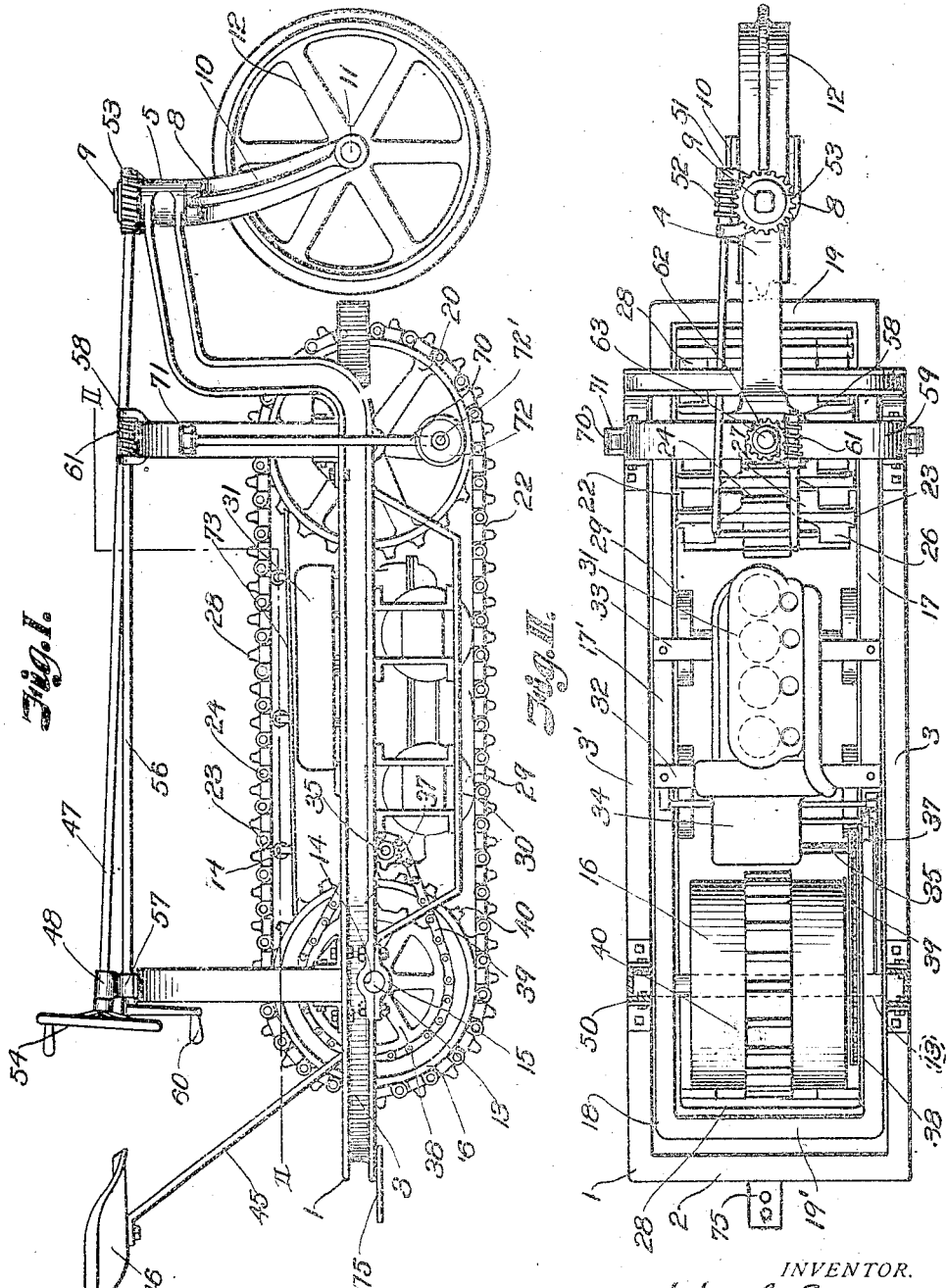
INVENTOR.
John A. Cowan.
BY Arthur C. Brown.
ATTORNEY

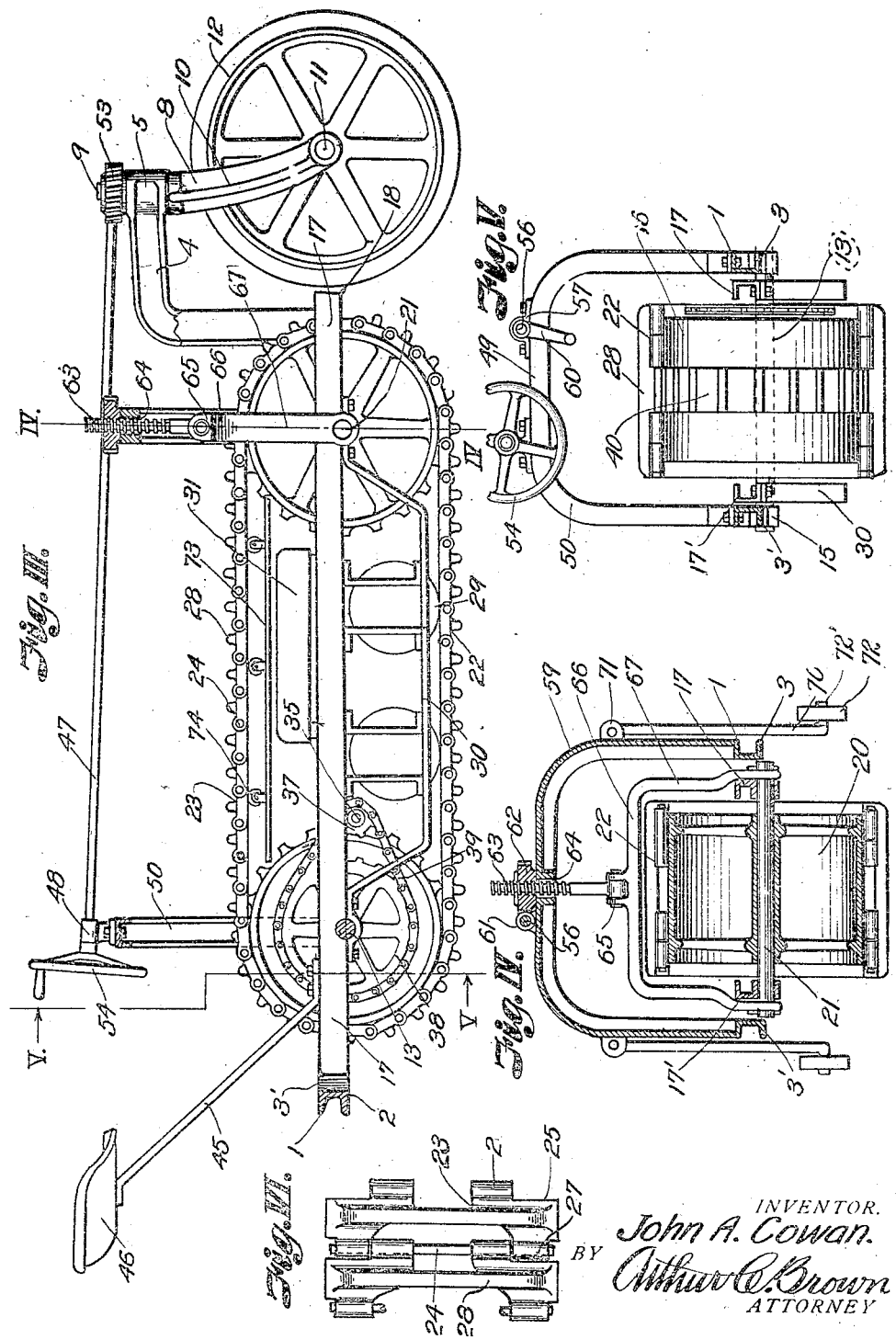

UNITED STATES PATENT OFFICE.

JOHN A. COWAN, OF KANSAS CITY, MISSOURI.

TRACTOR.

1,306,469. Specification of Letters Patent. Patented June 10, 1919.

Application filed November 23, 1917. Serial No. 203,535.

*To all whom it may concern:*

Be it known that I, JOHN A. COWAN, a citizen of the Dominion of Canada, residing at Kansas City, in the county of Jackson and State of Missouri, have invented certain new and useful Improvements in Tractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to tractors, and more particularly to tractors employing a caterpillar tread for increasing the effective traction surface of the machine; the principal object of the invention being to provide a tractor of this character particularly adapted for operation between closely spaced rows of grain, and for facilitating turning of the device in a small space which heretofore, due to the extended tread of the caterpillar belt, has been a difficult matter.

It is a further object of the invention to provide improvements in frame construction whereby the motor mechanism may be suspended sufficiently to eliminate any tendency to overbalance the device, and additional means for preventing tipping should the machine become overbalanced while operating on a sloping surface.

In accomplishing these objects, I have provided improved details of structure, the preferred forms of which are illustrated in the accompanying drawings, wherein:—

Figure I is a side elevation of a tractor constructed according to the present invention.

Fig. II is a sectional plan view of the same on the line II—II, Fig. I.

Fig. III is a side view of the tractor, with the outer frame shown in section, illustrating the mounting of the interior frame.

Fig. IV is a transverse vertical section on the line IV—IV, Fig. III.

Fig. V is a similar section on the line V—V, Fig. III.

Fig. VI is an enlarged detail view of a part of the tread belt.

Referring more in detail to the drawings:

1 designates the main or outer frame of the device, which is preferably of channel iron construction, and comprises a rear end rail 2 and longitudinal side rails 3—3', turned upwardly at their forward ends and drawn together into a neck 4 terminating in a bearing 5.

Extending vertically through the bearing and fixed at its lower end to the head of a wheel fork 8 seated against the base of the bearing is a fork stem 9, adapted for pivoting in the bearing to effect steering of the fork, and revolubly mounted between the forwardly curved legs 10 of the fork on an axle 11 is a ground wheel 12, which not only supports the front of the frame but also is under control of the operator to effect steering of the tractor.

Adjacent the rear end of the frame is a transverse shaft 13, the ends of which are seated in sockets 14 at transversely opposite sides of the frame and held therein by overlying plates 15 bolted to the frame rails. Revolubly mounted on the said shaft is a drum 16 which supports the rear end of the frame.

Pivotally supported by the cross shaft 13 at opposite ends of the drum 16 are the side rails 17—17' of a rectangular frame 18 that is located within the outer frame 1 and comprises the side rails 17—17' and front and rear connecting rails 19—19'.

At its forward end the frame 18 is supported by a drum 20 revolubly mounted between the rails 17—17' on a transverse shaft 21 and in alinement with the drum 16, and extending about said drum is a caterpillar tread belt 22 whereon the weight of the machine is placed.

In its preferred construction the belt comprises a plurality of links 23, pivotally connected by transverse pins 24, each link comprising spaced side members 25 having apertured ears 26—27 at their opposite sides which are adapted to register between similar ears of preceding and following links to receive the connecting pins, and extending between each of the side members of each link is a transmission rib 28 which serves as a traction shoe to prevent slipping of the belt in marshy or muddy ground.

To hold the belt tightly to the ground between the spaced end drums I provide a plurality of guide wheels 29, arranged at each side of the frame and revolubly carried by frames 30 attached to the side rails 17—17' and adapted for rolling contact with the inner faces of the belt links at their opposite ends to hold the belt in alinement between the drums, so that the greatest efficiency is derived therefrom.

To drive the tractor I provide a motor 31 that is suspended between the side beams 17—17' of the frame 18 on cross bars 32—33, and is connected through any suitable transmission mechanism, indicated by the case 34, with a revolubly mounted transverse shaft 35 carried by the frame 18 just ahead of the drum 16. Fixed on the said shaft and on the hub 36 of the drum are sprocket wheels 37—38 over which a chain belt 39 is run, so that operation of the motor will drive the drum and move the traction belt to drive the tractor.

Parts and mechanism for controlling the motor may be of the usual construction and, as they do not form a part of the invention, are not shown.

To prevent the belt slipping on the driving drum, I provide the latter, about its center, with an annular toothed surface 40, which is adapted to receive the cross pins 24 as the drum revolves so that the belt is carried forwardly therewith with the pins 24 meshing between the teeth of the drum.

Attached to the side rail 17 of the frame 18, at the rear end of the tractor, is a seat post 45 having a seat 46 thereon, whereon an operator may sit while driving the tractor. To steer the tractor from the driver's position I provide a steering rod 47 which is revolubly carried at its rear end in a bearing 48, mounted on the top rail 49 of a yoke beam 50, fixed to the rear of the frame 1 to arch over the drum 16 and revolubly mounted at its forward end, in bearings 51, that extend from the side of the bearing 5.

At its forward end the rod 47 is provided with a worm thread 52 which is adapted to travel in a worm gear wheel 53 that is fixed to the upper end of the fork stem 9. At the rear end of the rod 47, accessible to the driver, is a steering wheel 54 which may be revolved to turn the rod and effect steering operation of the wheel 12.

In machines of this character it has always been a difficult matter to turn in a small space, on account of the straight ahead traveling tendency of the traction belts, but in order to permit turning in a very small space I have provided mechanism for raising the forward end of the belt from the ground so that the tractor has practically a two point support which will permit the machine to be turned very short. This mechanism comprises a shaft 56 revolubly mounted in bearings 57—58 on the yoke beam 50 and a similar yoke beam 59 fixed to the outer frame at its forward end. At its rear end the shaft 56 has a crank 60 accessible to the driver and at its forward end has a worm thread 61 adapted to mesh with a worm gear wheel 62 that is threaded onto a shaft 63 that extends vertically through an aperture 64 in the yoke beam 59 and is pivotally attached at its lower end between spaced ears 65 on the cross beam 66 of a yoke member 67 pivotally mounted on the ends of the shaft 21 at the forward end of the frame 18.

With this arrangement it will be seen that the driver may operate the shaft 56 to revolve the gear 62 on the shaft 63 to raise or lower the forward end of the frame 18 to raise the traction belt from the ground at the forward end, and that with the belt so raised he may operate the steering mechanism to turn the steering fork to make a very short turn.

As the tractor is made very narrow, tipping on sloping ground is possible, but to avoid this I have pivotally suspended legs 70 from between ears 71 at opposite sides of the yoke beam 59 in such a manner that should the frame tip, the legs will swing outwardly and rollers 72 revolubly mounted on out-turned portion 72' at the lower ends of the legs will engage the ground to support the tractor against further tipping. When the tractor is brought back to upright position the legs swing back to their normal position.

In order to prevent dirt that may be carried by the belt 22 from dropping onto the engine parts, I cover the latter with a hood 73 that is attached to the frame 18 and on the top of the hood I mount a plurality of rollers 74 to support the belt between the drum to prevent its contacting with the hood.

At the rear of the outer frame I attach a coupling plate 75 whereby farm implements of various kinds may be attached to and drawn by the tractor.

With the tractor so constructed, it is apparent that it may be operated between closely spaced grain rows, and that a maximum amount of traction is derived from the caterpillar tread.

It is also apparent that by providing the mechanism for hoisting the forward end of the tread from operative contact with the ground, the device may be turned in a much smaller space than would otherwise be possible.

Having thus described my invention, what I claim as new therein, and desire to secure by Letters-Patent is:—

1. In a tractor, an exterior frame having a steering wheel at one end, an interior frame pivotally mounted at one end within the exterior frame at the end opposite the steering wheel, and adapted to move vertically at its free end, drums mounted at opposite ends of the pivoted frame, a traction belt extended about said drums, an arch beam mounted on the exterior frame and extending across the free end of the interior frame, a threaded shaft extending vertically through said arch beam having connection at its lower end with said interior frame, a gear wheel threaded onto the upper end of said bolt and seated on said yoke and means for revolving said gear wheel to actuate the bolt to raise or lower the free end of said interior frame for the purpose set forth.

2. In a tractor, an exterior frame having a steering wheel mounted at and supporting its forward end, a transverse shaft mounted adjacent the rear end of said frame, a drum mounted on the said shaft and supporting the frame at its rearward end, an interior frame supported at its rearward end on said shaft, a drum mounted at the forward end of the interior frame in alinement with the first named drum, a traction belt extended over said drums, arch beams mounted transversely on the exterior frame, a threaded shaft extending vertically through one of said arch beams having connection at its lower end with the free end of said interior frame, a gear wheel threaded onto the upper end of said shaft and seated on said arch beam, a shaft revolubly carried by said arch beams operatively connected with said gear wheel at one end, and means for actuating the shaft to revolve the gear wheel to raise or lower the free end of the interior frame.

3. In a tractor, an exterior frame having a steering wheel mounted at and supporting its forward end, a transverse shaft mounted adjacent the rear end of said frame, a drum mounted on the said shaft and supporting the frame at its rearward end, an interior frame supported at its rearward end on said shaft, a drum mounted at the forward end of the interior frame in alinement with the first named drum, a traction belt extended over said drums, a motor suspended from the interior frame between the drums and operatively connected therewith, arch beams mounted transversely on the exterior frame, a yoke mounted transversely on the interior frame at its free end, a shaft attached to said yoke and extended vertically through one of the said arch beams, a gear wheel threaded onto said shaft and seated against the upper face of said arch beam, a shaft revolubly carried by said arch beams and operable from the exterior of said tractor and having worm connection with said gear wheel and whereby the latter may be revolved to raise and lower the free end of the interior frame for the purpose set forth.

In testimony whereof I affix my signature.

JOHN A. COWAN.